March 4, 1930.   R. HOFSTETTER   1,749,076
APPARATUS FOR ASSEMBLING MEMBERS
Filed Feb. 15, 1927   4 Sheets-Sheet 1

Inventor
Robert Hofstetter
by /s/ Att'y

March 4, 1930. R. HOFSTETTER 1,749,076
APPARATUS FOR ASSEMBLING MEMBERS
Filed Feb. 15, 1927 4 Sheets-Sheet 2

Inventor
Robert Hofstetter
by *[signature]* Att'y.

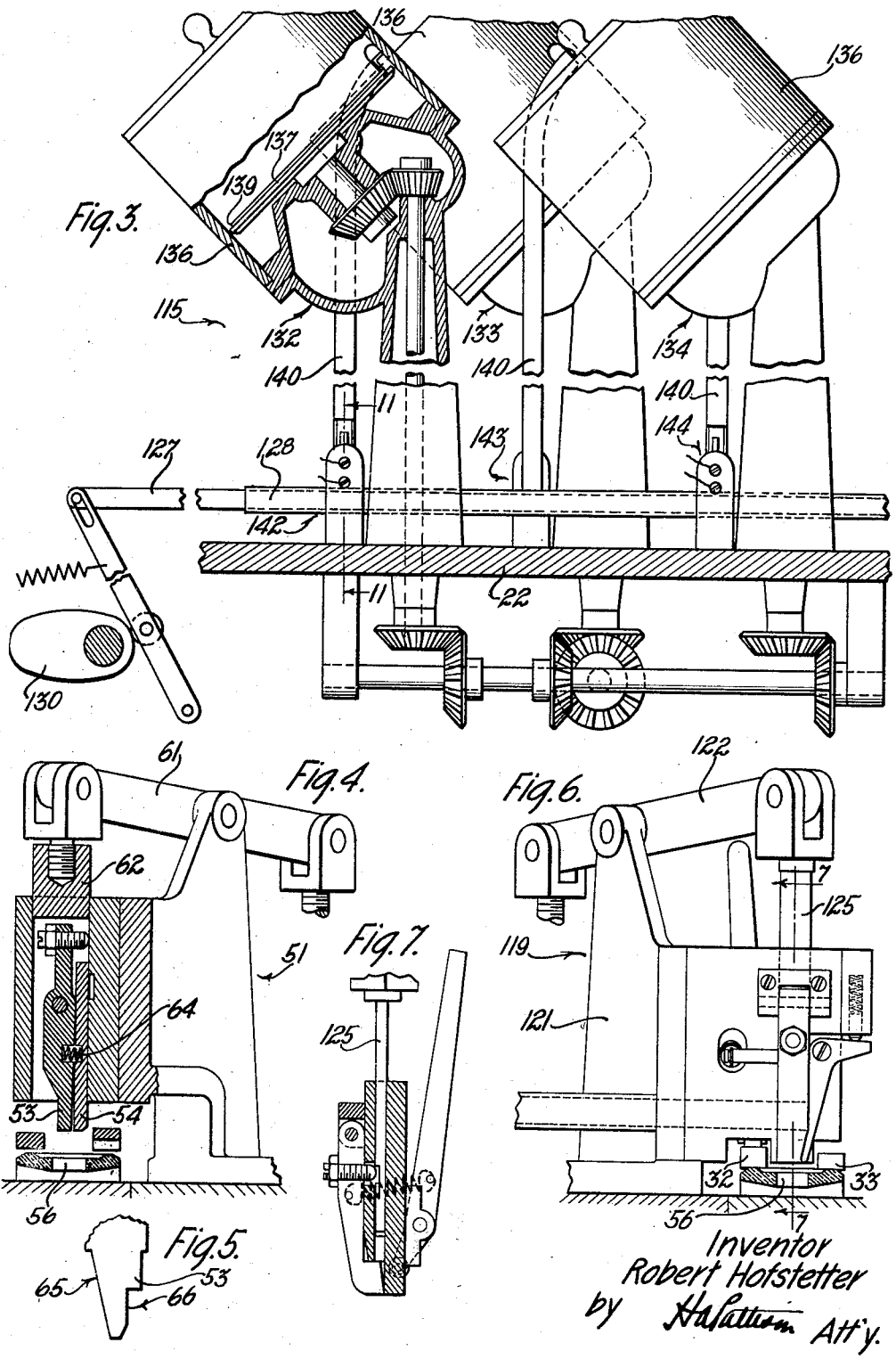

March 4, 1930.　　　R. HOFSTETTER　　　1,749,076
APPARATUS FOR ASSEMBLING MEMBERS
Filed Feb. 15, 1927　　　4 Sheets-Sheet 4
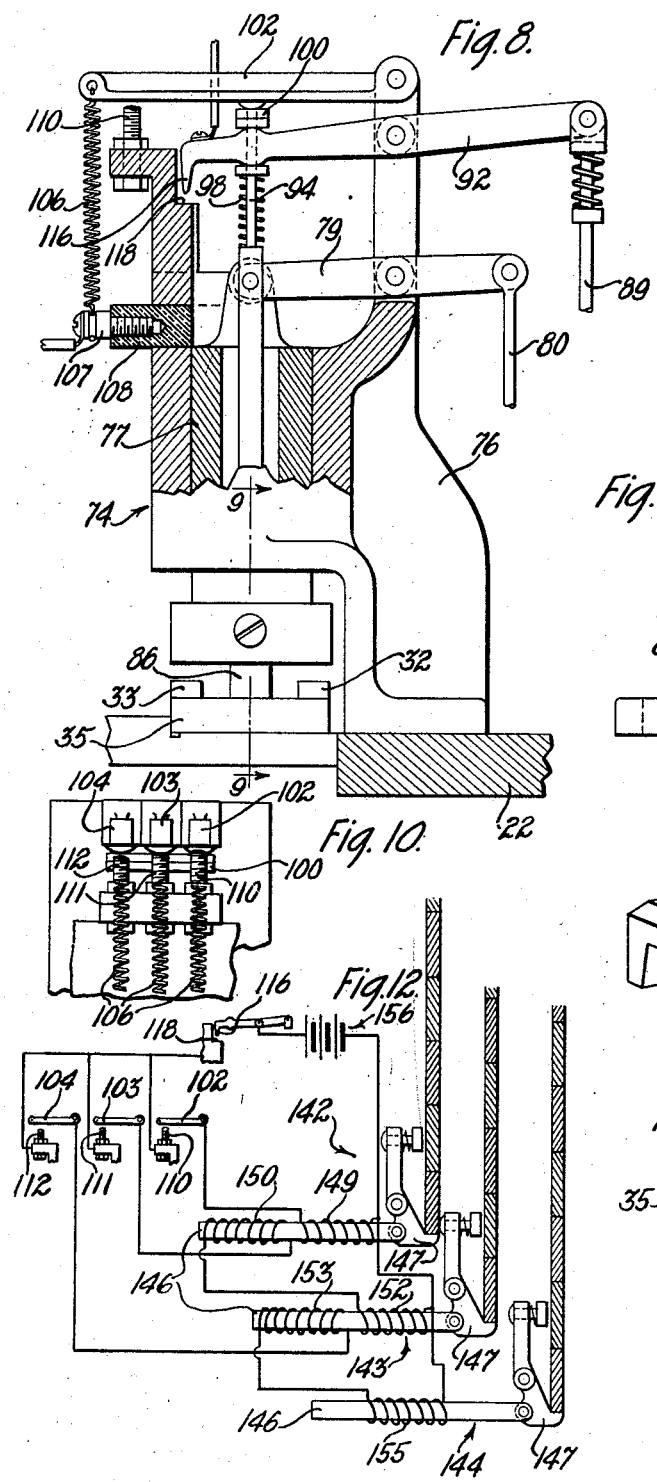
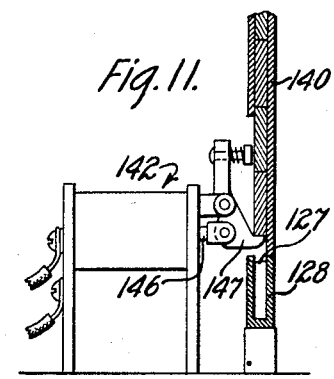
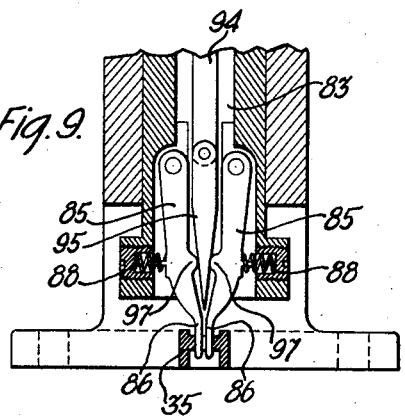
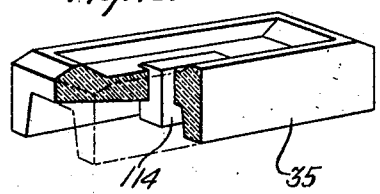
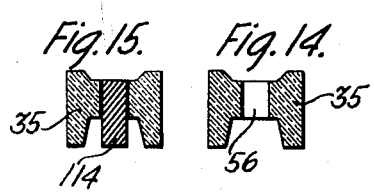
Inventor
Robert Hofstetter
by [signature] Att'y.

Patented Mar. 4, 1930

1,749,076

UNITED STATES PATENT OFFICE

ROBERT HOFSTETTER, OF DOWNERS GROVE, ILLINOIS, ASSIGNOR TO WESTERN ELECTRIC COMPANY, INCORPORATED, OF NEW YORK, N. Y., A CORPORATION OF NEW YORK

APPARATUS FOR ASSEMBLING MEMBERS

Application filed February 15, 1927. Serial No. 168,314.

This invention relates to apparatus for assembling members, and more particularly to methods of and apparatus for assembling protector block parts.

It is the practice in some instances in assembling certain classes of articles to establish the assembled relation of the individual parts thereof by the insertion of one part or member within an opening provided in another companion member. Thus, for example, in the assembling of members which constitute protector blocks of the type commonly employed for the purpose of protecting telephone circuits, a carbon electrode is inserted within the aperture of a companion porcelain block. The width of each carbon electrode should conform substantially to the width of the porcelain block aperture into which it is inserted in order to facilitate the securing of the insert in said central position by a subsequent application of bonding material or cement, as clearly set forth in my copending application, Serial No. 168,313, filed February 15, 1927.

The primary objects of this invention are to provide an improved apparatus for expeditiously and economically assembling previously gauged members within companion members.

To attain these and other objects and in accordance with the general features of the invention, an apparatus is provided which includes means for retaining separate supplies of previously gauged carbon inserts. Porcelain blocks are properly positioned upon a receiving means and subsequently the width of the aperture of each positioned block is gauged. In response to this gauging operation a previously gauged carbon insert conforming in width to the gauged aperture is delivered from its respective source of supply to an inserting station. The gauged porcelain block is then advanced and the selected carbon insert is inserted within the aperture of the block. The porcelain block and associated insert are then advanced or indexed from the inserting station and contemporaneously therewith the next advanced and gauged porcelain block is brought into association with the inserting station. Thus it will be understood that the porcelain blocks are supplied with carbon inserts which conform in size to the apertures thereof, the entire assembly operation being automatically controlled and the protector block parts assembled in continuous, successive order.

These and other objects and features of the invention will be more apparent from the following detailed description when considered in connection with the accompanying drawings illustrating and assembling apparatus embodying the features of the invention, in which Fig. 1 is a fragmentary plan view of an assembling apparatus which represents one embodiment of the invention;

Fig. 3 is a fragmentary, vertical, sectional view taken on the line 3—3 of Fig. 1, one of the carbon insert hoppers being broken away to disclose certain mechanisms otherwise hidden;

Fig. 4 is a detailed, sectional view of the positioning mechanisms taken on the line 4—4 of Fig. 1;

Fig. 5 is a fragmentary, elevational view of the lower end of the positioning fingers as viewed from the left (Fig. 4);

Fig. 6 is an elevational view of the carbon inserting mechanism taken on the line 6—6 of Fig. 1;

Fig. 7 is a detailed, vertical, sectional view taken on the line 7—7 of Fig. 6;

Fig. 8 is a fragmentary, vertical, sectional view taken on the line 8—8 of Fig. 1, disclosing the gauging mechanism partially in elevation and partially in section;

Fig. 9 is a sectional view of the gauging mechanism taken on the line 9—9 of Fig. 8;

Fig. 10 is a side elevational view of the upper portion of the gauging mechanism as viewed from the left (Fig. 3);

Fig. 11 is a vertical, sectional view taken on the line 11—11 of Fig. 3, an electrically operated trip mechanism being shown in elevation;

Fig. 12 is a circuit diagram disclosed in association with the insert trip mechanisms;

Fig. 13 is a perspective view of an assem-

Fig. 14 is a transverse, vertical section of the porcelain block disclosed in Fig. 3 disassociated from the carbon insert, and Fig. 15 is a similar section disclosing a carbon electrode inserted within the porcelain block.

Figure 1:
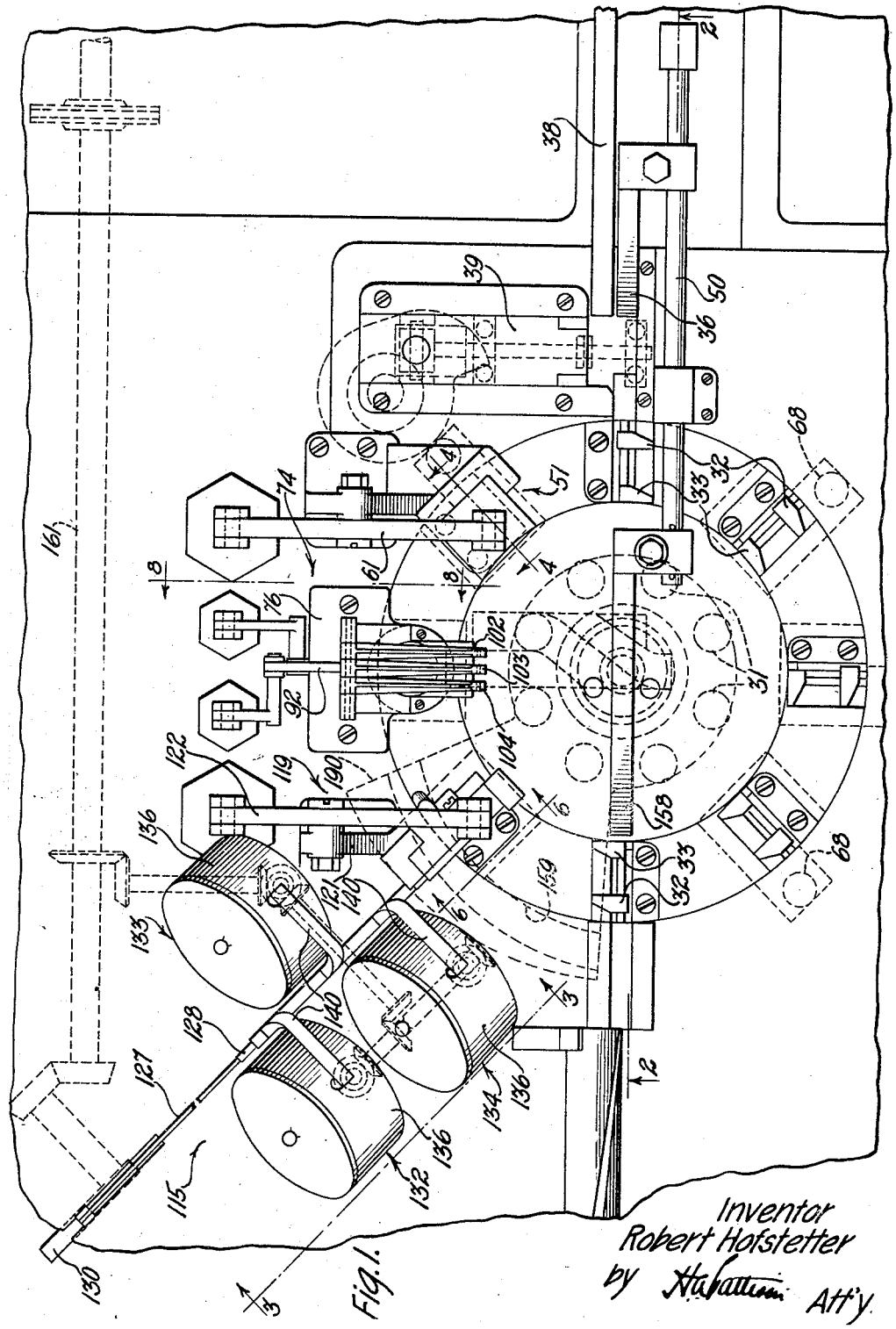

Referring now to the drawings wherein like numerals have been employed to designate similar parts throughout the various figures, it will be observed that for the purpose of illustration, applicant's invention has been disclosed in connection with an assembling machine simulating the type of machine disclosed and described in detail in applicant's copending application, Serial No. 168,313, filed February 15, 1927. An indexing mechanism denoted generally by the numeral 20 comprises a bearing member 21 mounted within a machine frame 22 and rotatable within the bearing member 21 is a vertical shank 24 (Fig. 2), the lower end of which is formed with an enlarged head or flange 25, and the upper end supporting a horizontally disposed indexing plate 26 secured thereto. Intermittent rotation is imparted to this indexing plate 26 by means of a switching or indexing cam 28 keyed to a drive shaft 29 which engages with rollers 31 carried on the lower face of the flange 25 so as to impart one-eighth of a revolution to the indexing plate 26 for every revolution of the drive shaft 29.

Figure 2:
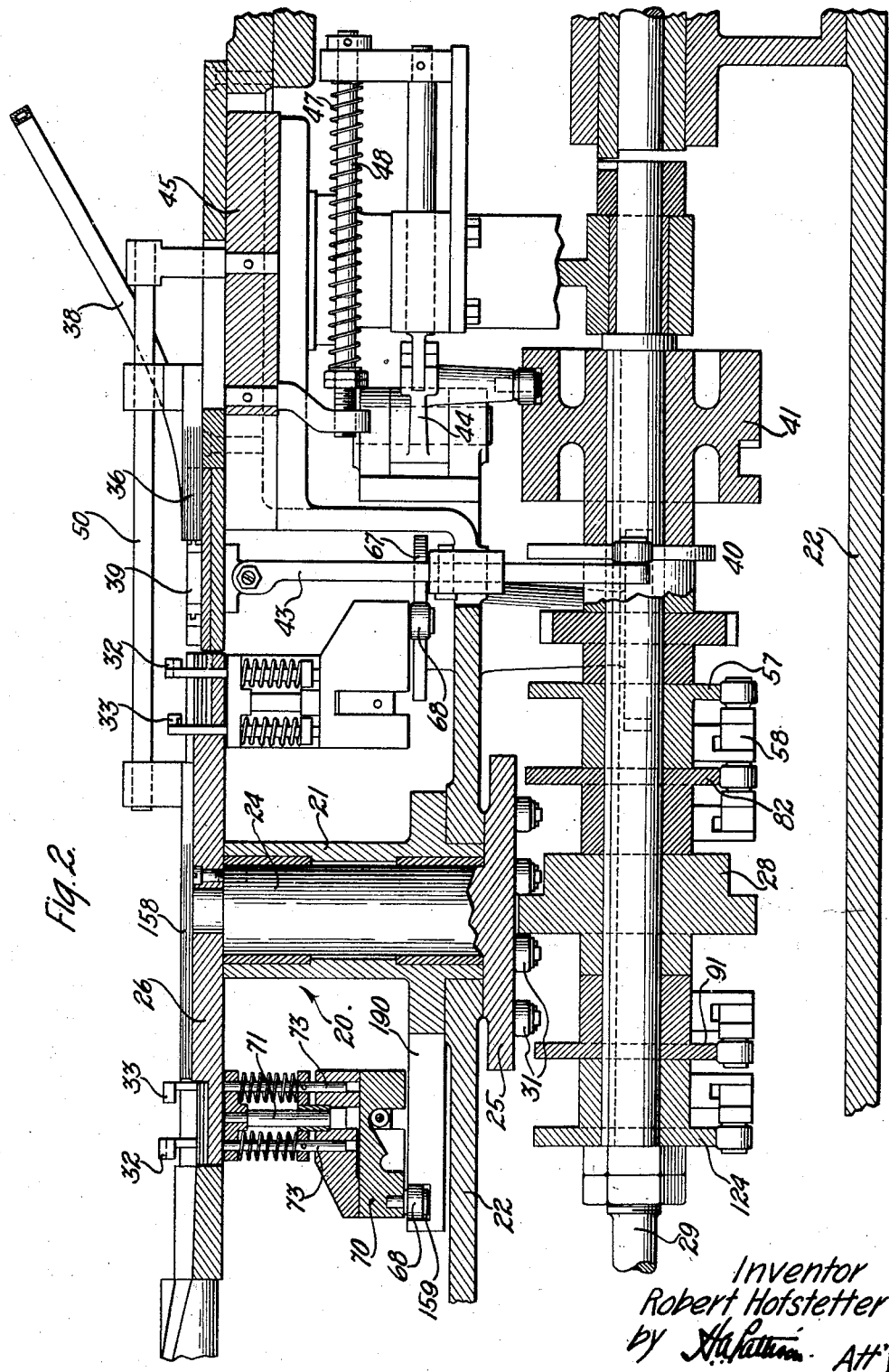
Fig. 2 is a vertical, sectional view taken on the line 2—2 of Fig. 1.

Equally spaced and marginally positioned with respect to the indexing plate 26 are eight pairs of clamping fingers 32 and 33 and during each dwell of the indexing mechanism 20 an apertured porcelain block 35 of the type disclosed in Figs. 13 to 15 inclusive conducted from a suitable source of supply (not shown) may be fed into position beneath the clamping fingers upon the forward movement of a shifter bar 36 (Figs. 1 and 2). These porcelain blocks 35 which may be guided by means of a suitable chute 38 are individually carried into operative association with the forward end of a ram 39 which is designed to intermittently advance a block thus associated into a position to be acted upon by the shifter bar 36. The mechanism for intermittently operating the shifter bar 36 and the ram 39 which are described in the detail in copending application, above referred to, include cams 40 and 41 carried by the drive shaft 29. The cam 40 operates a lever 43 which imparts a horizontally reciprocating movement to the ram 39 and the cam 41 actuates a horizontally disposed lever 44 which is operatively connected with a carriage 45 by means of a coil spring 47 encircling an actuating rod 48. The carriage 45 supports a rod 50 upon which the shifter bar 36 is mounted.

Upon being fed into position beneath the clamping fingers 32 and 33 by the shifter bar 36, the porcelain block 35 is indexed into association with a positioning station 51 (Figs. 1 and 4). During the dwell of the indexing plate at this station a pair of positioning fingers 53 and 54 (Fig. 4) are lowered into an aperture 56 of the positioned block. The lowering of the positioning fingers is occasioned through the action of a cam 57 (Fig. 2) which actuates a rocker arm 58 connected with one end of a rocker arm 61 which in turn actuates a slide block 62. When the fingers 53 and 54 reach their lowermost position a spring 64 causes the finger 53 to be swung outwardly with the result that the porcelain block 35 associated therewith is properly positioned. As shown in Fig. 5, the positioning fingers are provided with an angular surface 65 and a vertical surface 66 oppositely disposed therefrom which cooperate as the fingers are lowered within the aperture 56 of the porcelain block to arrange said block in proper lateral alignment. At this stage of the operation the clamping fingers 32 and 33 are moved downwardly so as to firmly grip the porcelain block therebeneath.

The movement of the clamping fingers 32 and 33 is controlled through the operation of a continuously rotating cam 67 which is adapted upon each rotation thereof to engage with a roller 68 carried by a slidable cam block 70. The engagement of this cam 67 with the roller 68 causes the cam block 70 to be moved inwardly with the result that a plunger 71 having a spring connection with pins 73 is lowered. The pins 73 support the clamping fingers and hence said fingers are yieldingly held in clamping engagement with the porcelain block. The porcelain block now clamped in proper position is carried into association with a gauging mechanism denoted generally by the numeral 74 (Figs. 1, 8 and 9).

This gauging mechanism 74 comprises a bracket member 76 which is suitably secured in an upright position upon the machine frame and is provided with a vertically slidable head 77. The upper end of this head 77 is secured to one end of a rocker arm 79, the other end of said arm being connected to a vertical rod 80. The rocker arm 79 is operated through the action of a cam 82 (Fig. 2) mounted on the shaft 29, said cam being timed to effect the lowering of the slidable head 77 contemporaneously with the positioning of a porcelain block therebeneath. Pivoted within a longitudinal opening 83 provided in the head 77 is a pair of similar, oppositely disposed gauging fingers 85 (Fig. 9). These fingers are provided with tips 86 which are normally held closed by coil springs 88 mounted within the head 77. When the tips 86 have been lowered within the aperture 56 of a positioned porcelain block a push rod 89 is urged upwardly by the action of a cam 91 (Fig. 2) and a rocker arm 92 connected with the upper end of the rod 89 is actuated to cause the lowering of a vertical rod 94 (Fig. 8). The lower end of the rod 94 is provided with and supports a loosely mounted or hinged wedge shaped member 95 (Fig. 9) which upon the lowering thereof engages projections 97 on the pivoted fingers 85 and causes the tips 86 thereof to become separated. The lowering of the wedge shaped member 95 and the rod 94 upon which it is mounted is arrested when the tips 86 have been carried into engagement with opposite sides of the porcelain block aperture 56, but the forward end of the rocker arm 92 continues to be lowered against the action of a coil spring 98 encircling the upper end of the rod 94. The upper end of the rod 94 carries a cross bar 100 (Figs. 8 and 10) which engages the underside of three levers 102, 103 and 104 when said rod occupies its uppermost position. These levers are pivoted at one end to the upper end of the bracket 76, the opposite ends thereof being secured to coil springs 106 which continually exert a yielding downward pull on said levers and which serve also as a current conductor in an electrical circuit later to be described. The lower extremities of the springs 106 are secured to terminal posts 107 mounted within an insulating block 108 supported by the bracket 76. Positioned beneath each of the levers 102, 103 and 104 near the free ends thereof are three threaded studs or contacts 110, 111 and 112 (Figs. 8 and 10) which are suitably secured to the upper end of the bracket 76 and are designed for engagement with their respective companion levers at different levels. Thus, for example, the stud or contact 110 will be engaged by its companion lever 102 upon the lowering of the cross head 100 prior to the engagement of the lever 103 with its companion contact 111 and likewise the engagement of the lever 104 with the contact 112 will be subsequent to the engagement of the lever 103 with the contact 111. Obviously, if the cross head 100 is lowered sufficiently all of the levers will be carried into engagement with their respective contacts.

From the foregoing it will be clear that the distance through which the rod 94 and the fingers 102, 103 and 104 are lowered will be determined by the width of the aperture 56 of the porcelain block in which the finger tips 86 are separated. If the porcelain block aperture is relatively small the lowering of the cross head 100 will only be sufficient to permit the lever 102 to engage with the contact 110 and if the aperture 56 is of medium width both of the levers 102 and 103 will engage with their respective contacts and likewise if said aperture is relatively large, all of the levers 102, 103 and 104 will engage their respective contacts. In connection with the functioning of the gauging mechanism, just described, it is to be understood that the engagement of the levers 102, 103 and 104 and their respective contacts serves to effect certain electrical circuits, later to be described, which control mechanisms to effect the proper selection of carbon electrodes or inserts 114 from a supply station 115 (Figs. 1 and 3). It is also to be understood that the forward extremity of the rocker arm 92 which is provided with a contact 116 operates upon the engagement of said contact with a shoulder surface 118 (Fig. 8) to close certain electrical circuits not yet described, subsequent to the engagement of any one or all of levers 102, 103 and 104 with their respective contacts.

Subsequent to the gauging of the porcelain block 35, it is advanced into association with a carbon electrode inserting station 119 (Figs. 1, 6, and 7). This inserting station mechanism 119 includes a bracket 121 which supports a pivoted rocker arm 122. One extremity of the rocker arm 122 is operatively connected with a cam 124 (Fig. 1) on the drive shaft 29 and the other extremity supports a plunger 125 which is designed to feed carbon inserts positioned thereunder into the aperture 56 of the positioned porcelain block. The carbon inserts 114 are advanced into position beneath the plunger 125 through the action of a ram 127 (Figs. 1 and 3) which is reciprocably operable within a horizontal guideway 128 through the action of a suitable cam 130. During each rotation of the cam 130 the ram 127 experiences one complete reciprocation and during the advancing stroke thereof causes a carbon insert delivered into the guideway 128 by a mechanism about to be described to be advanced into position beneath the inserting plunger 125.

The carbon insert supply station 115 comprises a group of hopper mechanisms 132, 133 and 134 each including a fixed hopper 136. A receiving plate 137 rotatable within each of the hoppers 136 is provided with an annular groove 139 (Fig. 3) which is adapted to receive and advance carbon inserts to a delivery chute 140 which is designed to direct inserts fed thereto downwardly into association with trip mechanisms or magnets, these mechanisms being denoted generally by numerals 142, 143 and 144, corresponding to the hopper mechanisms 132, 133 and 134, respectively. These trip mechanisms each comprise a plunger 146 which is pivotally connected with a latch member 147 (Figs. 11 and 12) and it will be apparent that upon the actuation of one of the plungers 146 the latch 147 companion thereto will be disengaged and the lowermost carbon insert within the associated chute 140 will be delivered into the guideway 128. The carbon inserts placed within the hopper mechanism 132 are of a type which have been previously gauged and found to be suitable for porcelain blocks having relatively small apertures and the inserts placed within the hopper mechanism 133 are those which are of relatively medium thickness while inserts within the mechanism 134 are of greater thickness than the inserts placed within the other hopper mechanisms.

Referring now to the circuit diagram disclosed in Fig. 12, it will be observed that the plunger 146 of the trip mechanism or magnet 142 includes a pair of induction coils 149 and 150, the magnet 143 likewise comprising a pair of induction coils 152 and 153 and the magnet 144 comprising a single induction coil 155. One terminal of the coil 149 of the magnet 142 is electrically connected with the lever 102 and the other terminal thereof is connected with one terminal of a suitable source of electrical current supply 156, the opposite terminal of said supply being connected with the lever arm 92. Thus, it will be apparent that when a porcelain block having a relatively small aperture is being gauged in response to the actuation of the arm 92 and the rod 90 (Fig. 8) an electrical connection is established within the circuit containing the coil 149 by the engagement of the lever 102 with the contact 110 and upon the continued movement of the arm 92 subsequent to this engagement, the circuit will be closed upon engagement of the contact 116 of the arm 92 with the surface 118. The magnet 142 will be energized and its plunger actuated so as to effect the deposition within the guideway 128 of a previously gauged carbon insert from the hopper mechanism 132. If a porcelain block having an aperture of medium size is being gauged, the levers 102 and 103 will engage their respective contacts and hence the circuit containing the coils 150 and 152 together with the circuit containing the coil 149 will be closed, the energizing of the coil 150 in this instance serving to counteract the inductive effect of the coil 149, thereby rendering the plunger of the magnet 142 functionally inoperative. The energizing of the coil 152 of the magnet 143, however, will cause the actuation of its companion latch member 147. Thus a previously gauged carbon insert of medium thickness will be deposited into the guideway 128 from the hopper mechanism 133. In the event that all of the levers 102, 103 and 104 are carried into engagement with their respective contacts, the circuit containing coils 153 and 155 will be closed together with the closing of the aforementioned circuits, and in this instance, the energizing of coils 150 and 153 serves to counteract the inductive effect of the coils 149 and 152, respectively, thereby rendering the plungers of the magnets 142 and 143 functionally inoperative. The energizing of the coil 155, however, causes the actuation of its associated latch 147 and a carbon insert of greater thickness from the hopper mechanism 134 will be delivered into the guideway 128. From the foregoing description it will be clearly understood that upon each forward stroke of the ram 127 a carbon insert corresponding to the determination made by the gauging mechanism 74 will be advanced to the inserting station.

After the carbon electrode has been properly inserted within its companion porcelain block these associated members are delivered into a position to be subsequently acted upon by a shifter bar 158 which is supported by the rod 50. In order that the porcelain block and its associated insert may be readily removed from the indexing plate 26, the clamping fingers 32 and 33 must be elevated to release the block. This is accomplished by means of a cam slot 159 (Figs. 1 and 2) provided in a projection 190 extending laterally from and formed integral with the lower portion of the bearing 21. The rollers 68 entering the cam slot 159 are carried outwardly and the clamping fingers 32 and 33 are thereby released.

In the operation of the assembling apparatus, just described, rotation is imparted to the shaft 29 and a shaft 161 (Fig. 1) in parallelism therewith from a common source of suitable power supply (not shown). The shaft 161 through a geared connection at one extremity thereof imparts continuous rotation to the cam 130 which causes the reciprocation of the ram 127 and the shaft 161 also causes continuous rotation of the receiving plates 137 within each of the carbon insert hoppers 136 through suitable driving mechanisms positioned beneath each of the hopper mechanisms (Fig. 3). Previously gauged carbon inserts 114 are placed within their respective hoppers 136 and porcelain blocks 35 are intermittently delivered to the indexing plate 26 upon each reciprocation of the ram 39 and the shifter bar 36. A block thus associated with the plate 26 is advanced to the positioning station 51 where it is properly positioned by the fingers 53 and 54 and yieldingly clamped in position upon the plate 26 by the fingers 32 and 33. A subsequent indexing movement advances the block to the gauging mechanism 74 in which position the tips 86 of the gauging fingers 85 are lowered into the aperture 56 of the positioned block and in response to the degree of separation of the tips 86 therein, one or more of the electrical circuits containing the trip magnets 142, 143 and 144 are closed and one of the plungers 146 is actuated. The actuation of this plunger causes the lowermost previously gauged insert 114 within the chute 140 associated with the latch 147 of the actuated plunger to be deposited within the guideway 128 and the forward stroke of the ram 127 carries this deposited insert to the inserting station 119. The gauged porcelain block is contemporaneously advanced to receive the deposited insert at the station 119 and subsequent to the insertion of the carbon electrode or insert within the aperture of the block, said block is advanced into position to be engaged by the shifter bar 158. From the foregoing it will be clearly understood that the operation of the machine is continuous and that previously gauged inserts are selected in response to the gauging of the porcelain block apertures and subsequently inserted within companion gauged apertures in continuous, successive order.

Although the invention as herein illustrated and described is particularly well adapted for assembling protector block parts, it should be understood that the novel features thereof are capable of other applications and should be limited only by the scope of the appended claims.

What is claimed is:

1. In apparatus for assembling previously gauged members with companion members, retaining means for individual supplies of previously gauged members, means for gauging companion members, actuating means therefor, and means operable in response to the actuation of the gauging means to selectively release members from the individual supplies thereof for association with the gauged companion members in accordance with the determination made by the gauging means.

2. In apparatus for assembling previously gauged members with companion members, retaining means for individual supplies of previously gauged members, an assembling mechanism, means for gauging companion members, actuating means therefor, means operable in response to the actuation of the gauging means to selectively release members from an individual supply in accordance with the determination made by the gauging means, and means for feeding the released members to the assembling mechanism.

3. In apparatus for assembling previously gauged members with companion members, retaining means for individual supplies of previously gauged members, an assembling mechanism, means for gauging companion members, actuating means therefor, means for continually advancing companion members to the gauging means and the assembling mechanism, means operable in response to the actuation of the gauging means to selectively release members from individual supplies in accordance with the determination made by the gauging means, and means for feeding released members to the assembling mechanism contemporaneously with the advancement thereto of a gauged companion member.

4. In apparatus for assembling previously gauged members with companion apertured members, retaining means for individual supplies of previously gauged members, an inserting mechanism, means for gauging the apertures of companion members, actuating means therefor, means operable in response to the actuation of the gauging means to selectively release members from individual supplies for association with the inserting mechanism, and means for advancing a gauged companion member to the inserting mechanism.

5. In apparatus for assembling previously gauged members with companion apertured members, retaining means for individual supplies of previously gauged members, an inserting mechanism, means for gauging the apertures of companion members, actuating means therefor, means associated with each retaining means for releasing members therefrom, means for selectively operating the releasing means in response to the actuation of the gauging means, and means for advancing selectively released members to the inserting mechanism.

6. In apparatus for assembling previously gauged members with companion apertured members, retaining means for individual supplies of previously gauged members, an inserting mechanism, means for gauging the apertures of companion members, actuating means therefor, an intermittently operable indexing mechanism for receiving and advancing apertured members to the gauging means and the inserting mechanism, a plurality of electrically controlled tripping devices associated with the individual supplies, means operable in response to the actuation of the gauging means for selectively operating the tripping devices to release members from the individual supplies in accordance with the gauging determination, means for advancing selectively released members to the inserting mechanism, and means for actuating the inserting mechanism during the dwell of the indexing mechanism.

7. In apparatus for assembling previously gauged protector block electrodes with companion apertured blocks, hoppers for individual supplies of previously gauged electrodes, an inserting mechanism, means for gauging the apertures of companion blocks, actuating means therefor, an indexing plate for receiving and intermittently advancing companion apertured blocks to the gauging means and the inserting mechanism, means for continually feeding apertured blocks to the indexing plate, electrically controlled tripping devices associated with the hoppers, means for selectively operating the tripping devices in response to the actuation of the gauging mechanism to release electrodes from their individual supplies in accordance with the gauging determination, means for feeding a released electrode to the inserting mechanism contemporaneously with the advancement thereto of a companion gauged block, and means for actuating the inserting mechanism during the dwell of the indexing plate.

8. In apparatus for assembling members of various sizes with companion members having apertures of various sizes, a plurality of retaining members, one for each size of the first mentioned members, means for individually gauging the apertures of the companion members, and means responsive to the gauging means for selectively and individually releasing the first mentioned members from the retaining members.

9. In apparatus for assembling members of various sizes with companion members having apertures of various sizes, a plurality of containers, one for each size of the first mentioned members, means for individually gauging the apertures of the companion members, means responsive to the gauging means for selectively and individually releasing the first mentioned members from the containers, and means for conveying the said members into associated relation with each other.

In witness whereof, I hereunto subscribe my name this 31 day of January, A. D. 1927.

ROBERT HOFSTETTER.